US006214903B1

(12) United States Patent
Eisinger et al.

(10) Patent No.: US 6,214,903 B1
(45) Date of Patent: Apr. 10, 2001

(54) POST-REACTOR PROCESS FOR TREATING POLYMERS PREPARED IN A GAS PHASE POLYMERIZATION IN THE PRESENCE OF AN INERT PARTICULATE MATERIAL

(75) Inventors: Ronald Steven Eisinger, Charleston; Fathi David Hussein, Cross Lanes, both of WV (US); David Nunn Jones, Long Vallley, NJ (US); Ronald Irvin Raether, Cross Lanes; David Merrill Rebhan, Alum Creek, both of WV (US); Joseph Patrick Welch; Gary Harry Williams, both of Flemington, NJ (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 0 days.

(21) Appl. No.: 09/098,479

(22) Filed: Jun. 16, 1998

(51) Int. Cl.$^7$ ........................................ C08J 3/00
(52) U.S. Cl. ............................ 523/330; 528/483
(58) Field of Search .............................. 523/330; 528/483

(56) References Cited

U.S. PATENT DOCUMENTS

| 4,078,113 | * | 3/1978 | Starbuck | 428/196 |
|---|---|---|---|---|
| 4,086,414 | * | 4/1978 | Hornbaker | 528/500 |
| 4,104,459 | * | 8/1978 | Hornbaker | 528/499 |
| 4,292,424 | * | 9/1981 | Huddleston | 528/500 |
| 4,334,057 | * | 6/1982 | Govoni | 528/500 |
| 4,372,758 | | 2/1983 | Bobst et al. | 55/48 |
| 4,710,538 | | 12/1987 | Jorgensen | 525/53 |
| 4,758,654 | | 7/1988 | Brod et al. | 528/483 |
| 4,994,534 | | 2/1991 | Rhee et al. | 526/88 |
| 5,191,062 | | 3/1993 | Bernier et al. | 528/483 |
| 5,292,863 | | 3/1994 | Wang | 528/483 |
| 5,376,742 | | 12/1994 | Krause | 526/68 |
| 5,478,922 | | 12/1995 | Rhee et al. | 528/483 |
| 5,688,910 | | 11/1997 | Wang | 528/483 |

FOREIGN PATENT DOCUMENTS

| 0570966 A1 | 11/1993 | (EP) . |
| 0586244 A1 | 3/1994 | (EP) . |
| 0765886 A1 | 4/1997 | (EP) . |

* cited by examiner

*Primary Examiner*—Paul R. Michl
(74) *Attorney, Agent, or Firm*—R. C. Brown; P. W. Leuzzi

(57) ABSTRACT

There is provided a post-reactor process for a polymer, especially an elastomeric polymer, prepared by a gas phase polymerization in the presence of an inert particulate material comprising: introducing the polymer containing inert particulate material into a polishing vessel in the presence of a fluidizing gas under polishing conditions.

13 Claims, 2 Drawing Sheets

FE-SEM Photograph 1: Case 5a
29.4 phr Carbon Black

FE-SEM Photograph 2: Case 5b
14.3 phr Carbon Black

FE-SEM Photograph 3: Case 6a
33.4 phr Carbon Black

FE-SEM Photograph 4: Case 6b
17.3 phr Carbon Black

POST-REACTOR PROCESS FOR TREATING POLYMERS PREPARED IN A GAS PHASE POLYMERIZATION IN THE PRESENCE OF AN INERT PARTICULATE MATERIAL

FIELD OF THE INVENTION

The invention relates to a post-reactor process for treating or handling polymers prepared in a gas phase polymerization in the presence of an inert particulate material. More particularly, the invention relates to a process for treating such elastomers so that fines are reduced and the elastomer is more robust during subsequent processing. The invention also relates to a process for treating such elastomers to remove residual monomers and dienes as well as to adequately neutralize and stabilize residual catalyst by-products to prevent product degradation.

BACKGROUND OF THE INVENTION

U.S. Pat. No. 4,994,534 discloses the polymerization of sticky polymers (also referred to as elastomers) in a gas phase fluidized bed reactor at or above their softening or sticking temperature in the presence of an inert particulate material (carbon black, silica, talc, clay, and the like). U.S. Pat. No. 5,304,588 teaches that the polymer produced using this process produces a unique, non-sticky elastomeric resin particle having an outer shell composed mostly of inert particulate material (e.g., carbon black) and an inner core composed mostly of polymer. In contrast to bale-form sticky polymer produced in solution and slurry polymerizations in the absence of inert particulate material, the gas phase-produced elastomer particles are granular and free-flowing as they exit the reactor and require no post-reactor pulverizing or grinding prior to their introduction into end-use applications. The elastomer is obtained in particle form with an average particle size ranging from about 0.015 to 0.06 inches.

In contrast to other gas phase reactor produced polymers (e.g., homo- and co-polymers of ethylene and/or propylene), it has been discovered that the post-reactor handling of these elastomers is difficult. That is, other non-elastomeric gas phase reactor products require only mild treatment to remove unreacted monomers and other inert hydrocarbons dissolved in the polymer. Their low catalyst residues are readily deactivated by means of additives and do not require an extraction step.

However, gas phase produced elastomers having inert particulate material incorporated in and/or on them are more difficult to treat post-reactor because they can contain one or more dienes and inert particulate materials incorporated in the polymer matrix. For example, a sticky polymer or elastomer produced in the gas phase is much more difficult to treat post-reactor since the diene component (1) has pendant double bond is capable of cross-linking, (2) is a flammable hydrocarbon, (3) can have an unpleasant odor with a very low human detection threshold, (4) is expensive making re-use critical, (5) takes 6 to 10 times longer to desorb than do the other monomers (e.g., $C_2$ and $C_3$) under equivalent processing conditions. Further, post-reactor side- or by-product reactions can cause odor requiring stabilization and/or purging.

Also, it has now been discovered that the elastomeric polymer polymerized using an inert particulate material can produce fines due to inert particulate material not securely or firmly incorporated in the elastomer product. Fines are particles of inert particulate material and/or particles composed of inert particulate material and small quantities of polymer having an average diameter of less than 100 $\mu$m. These fines can foul downstream processing equipment (e.g., pipes, valves, feeders, etc.) resulting in a production shutdown. Accordingly, unlike other polymers produced in the gas phase in the absence of inert particulate material, these elastomers, though rendered granular, non-sticky, and free-flowing by the above-described gas phase polymerization process utilizing inert particulate materials, now require some unique post-reactor processing in order to prevent and/or minimize the presence of fines and/or to improve the robustness of the polymer particle for intact survival during subsequent processing and end-use applications.

Additionally, elastomeric polymers are prone to gel formation due to the existence of residual diene, chloride by-products of the co-catalyst and promoter. Further, elastomeric diene based products can undergo free-radical-initiated degradation, transition-metal-catalyzed degradation, and/or acid-catalyzed degradation or other undesirable post-side reactions. Hence, there is a need to properly treat these elastomeric polymers upon exiting the polymerization reactor to prevent or minimize gel formations and to stabilize and/or prevent post-side reactions prior to packaging the final polymeric product.

Therefore, there is an on-going need for improved materials handling of these polymers upon leaving a gas phase polymerization reactor.

SUMMARY OF THE INVENTION

Accordingly, there is provided an improved post-reactor process for improving the robustness of a polymer particles containing at least 0.3 wt % of an inert particulate material. The process comprises introducing the polymer containing at least 0.3 wt % of the inert particulate material into a fluidized polishing vessel wherein the polymer containing inert particulate material is fluidized using an inert gas; the temperature of the polymer ranges from about 20 to 100 degrees C; the temperature of a fluidizing gas ranges from about 20 to 150 degrees C; the pressure in the polishing vessel ranges from about 2 psi to 50 psi; and the average residence time for the polymer containing inert particulate material ranges from about 15 minutes to 8 hours. Preferably, the superficial gas velocity ranges from about 0.6 to 3 ft/sec and the temperature of the polishing vessel ranges from about 50 to 100 degrees C.

Also, in another preferred embodiment of the invention, the elastomeric material is treated in the fluidized polishing vessel to prevent/minimize gel formation by injecting a gel inhibitor such as an alcohol ($C_1$–$C_{20}$ alcohol) proportional to the amount of alkyl (i.e., for example, aluminum alkyl from the cocatalyst) used in the polymerization reaction. The molar ratio of alcohol-to-alkyl is about 0.5:1 to 6:1.

In still another preferred embodiment of the invention, the elastomeric material in the fluidized polishing vessel is contacted with a stabilization package.

DETAILED DESCRIPTION OF THE INVENTION

Figure 1:
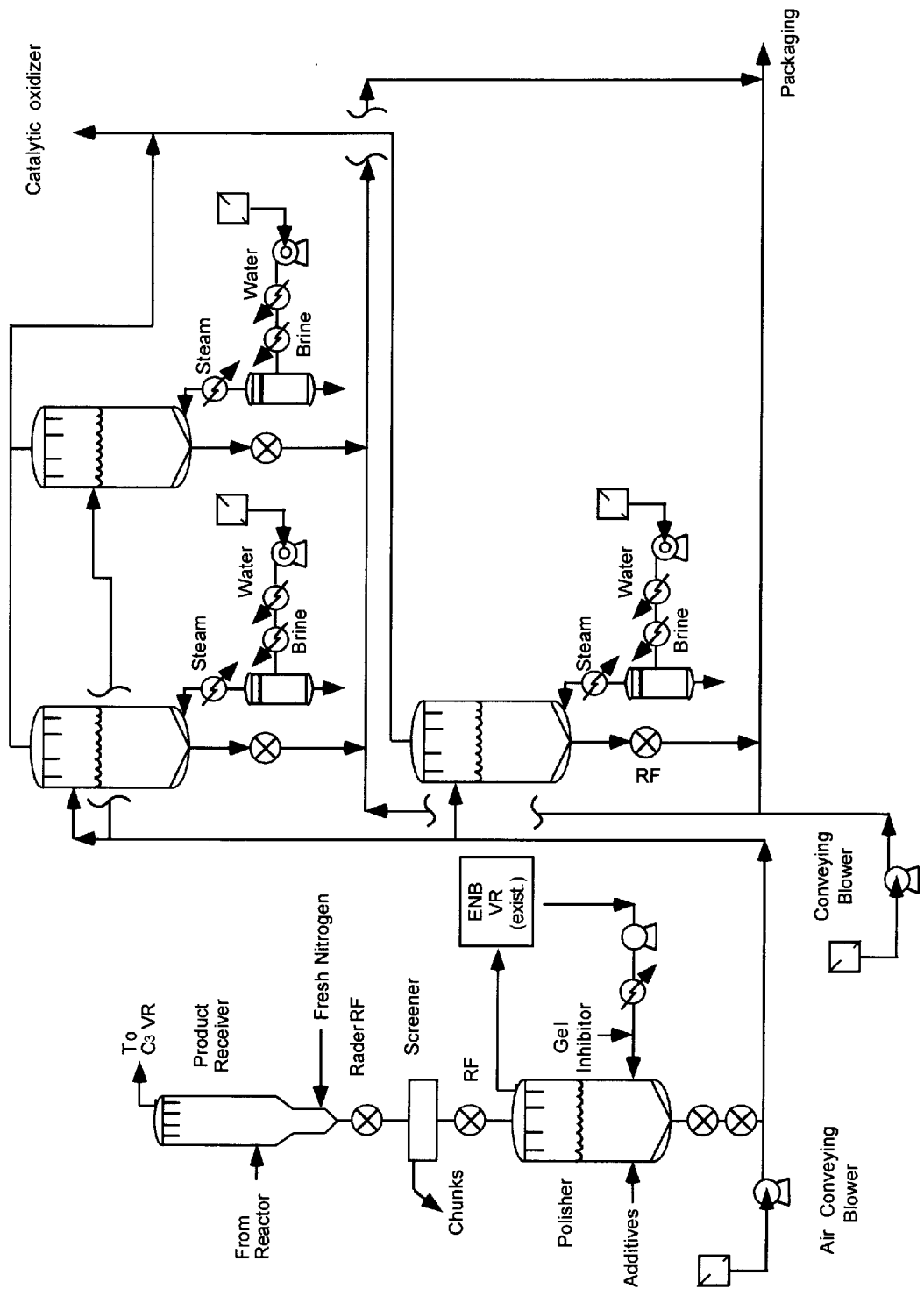
FIG. 1 is a schematic drawing of the post-reactor process for polishing and treating polymers containing inert particulate material in a fluidized bed vessel in the presence of a fluidizing gas. Photographs 1 through 4 demonstrate polymer particle robustness results for the experiments.
Figure 2:
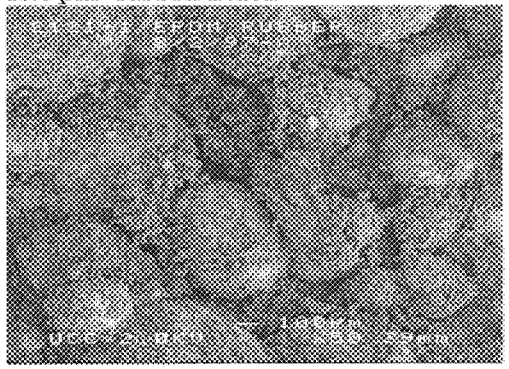
Figure 2:
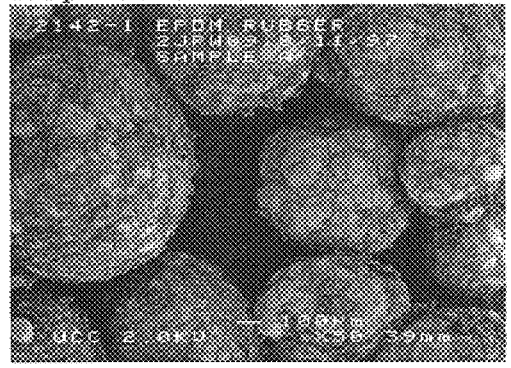
Figure 2:
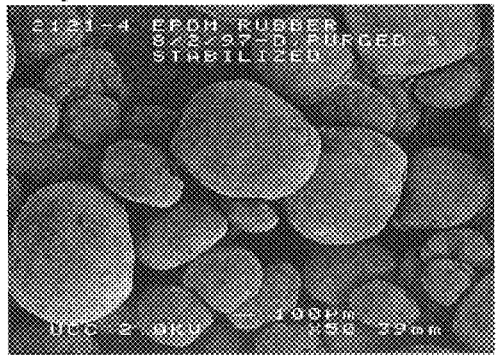
Figure 2:
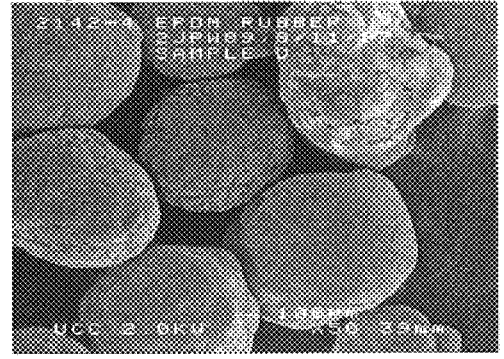

Polymers.

Illustrative of the granular, free-flowing polymers produced with inert particulate materials in a gas phase polymerization that can be processed in accordance with the invention are the following:

IR (polyisoprene)

BR (polybutadiene)

SBR (polymer of butadiene copolymerized with styrene)

Nitrile (polymer of butadiene copolymerized with acrylonitrile)

Butyl (polymer of isobutylene copolymerized with isoprene)

EPM (polymer of ethylene copolymerized with propylene)

EPDM (polymer of ethylene copolymerized with propylene and a diene such as hexadiene, dicyclopentadiene, or ethylidene norbornene)

Copolymers of ethylene and a $C_3$–$C_{12}$ alpha-olefin

Homopolymers of a $C_2$–$C_{18}$ alpha-olefin

Terpolymers of ethylene, an alpha olefin ($C_3$–$C_{12}$), and a diene (preferably non-conjugated)

Neoprene® (polychloroprene)

Silicone (polydimethyl siloxane)

Copolymers of ethylene and vinyltrimethoxy silane

Copolymers of ethylene and one or more of acryonitrile, maleic acid esters, vinyl acetate, acrylic and methacrylic acid esters and the like Copolymers of butadiene and isoprene Polystyrene Terpolymers of styrene, butadiene, and isoprene Chlorobutyl (chlorinated copolymer of isobutylene and isoprene)

Bromobutyl (brominated copolymer of isobutylene and isoprene)

Brominated copolymer of isobutylene and paramethylstyrene

Chlorinated and chloro-sulfonated polyethylenes

Of these, polyisoprene, polybutadiene, poly(styrenebutadiene) rubber, ethylene-alpha olefin polymers such as ethylenepropylene rubbers (EPM), and ethylene-alpha olefin-diene polymers such as ethylene-propylene-diene rubbers (EPDM) are preferred. Preferably, the olefin polymers are also based on or contain conjugated or non-conjugated dienes, such as linear, branched, or cyclic hydrocarbon dienes having from about 4 to about 20, preferably 4 to 12, carbon atoms. Preferred dienes include 2-methylpentadiene, 1,5-hexadiene, 5-vinyl-2-norbornene, 1,7-octadiene, 7-methyl-1,6-octadiene, vinyl cyclohexene, dicyclopentadiene, butadiene, isobutylene, isoprene, ethylidene norbornene, and the like.

Gas Phase Polymerization Processes and Conditions.

The above-described polymers, especially elastomeric polymers, are produced by the polymerization of monomers (e.g., olefins and/or diolefins and vinyl aromatic compounds) in gas phase processes using known equipment and reaction conditions, and it is not limited to any specific type of reaction. However, the preferred polymerization process is a gas phase process employing a fluidized bed or a fluidized bed assisted by means of mechanical stirrer.

Gas phase processes employable to produce such polymers can include so-called "conventional" gas phase processes, "condensedmode," and, most recent, "liquid-mode" processes. Conventional fluidized processes are disclosed, for example, in U.S. Pat. Nos. 3,922,322; 4,035,560; 4,994,534, and 5,317,036. Condensed mode polymerizations, including induced condensed mode, are taught, for example, in U.S. Pat. Nos. 4,543,399; 4,588,790; 4,994,534; 5,317,036; 5,352,749; and 5,462,999. Liquid mode or liquid monomer polymerization mode is described in U.S. Pat. No. 5,453,471; U.S. Ser. No. 510,375; and WO 96/04322 (PCT/US95/09826) and WO 96/04323 (PCT/US95/09827). For polymerizations such as ethylenepropylene copolymer (e.g., EPMs), ethylene-propylene-diene terpolymer (e.g., EPDMs), it is preferable to use conventional or condensing mode and employing an inert particulate material, a so-called fluidization aid or flow aid. For the so-called readily condensable monomers as described in U.S. Pat. No. 5,453,471, it is preferred to use a liquid mode polymerization in conjunction with the inert particulate materials.

Inert particulate materials are more fully described, for example, in U.S. Pat. No. 4,994,534 and include carbon black, silica, clay, talc, and mixtures thereof. Of these, carbon black, silica, and mixtures of them are preferred. Polymeric materials can also be used as fluidization aids. Typically, as described in the patent, the gas phase polymerization is conducted in the presence of inert particulate material ranging from about 0.3 to about 80 weight percent, preferably about 5% to about 75% based on the weight of the final product. Specifically, for carbon black or silica the amounts employed in this patent are about 0.3 to about 50% by weight, preferably about 5% to about 30%.

The polymerizations can be carried out in a single reactor or multiple reactors, typically two or more in series, can also be employed. For economic considerations, a single reactor is preferred. The essential parts of the reactor are the vessel, the bed, the gas distribution plate, inlet and outlet piping, at least one compressor, at least one cycle gas cooler, and a product discharge system. In the vessel, above the bed, there is a velocity reduction zone, and in the bed a reaction zone.

Generally, all of the above modes of polymerization are carried out in a gas phase fluidized bed containing a "seed bed" of polymer which is the same or different from the polymer being produced. Preferably, the bed is made up of the same granular resin that is to be produced in the reactor.

The bed is fluidized using a fluidizing gas comprising the monomer or monomers being polymerized, initial feed, make-up feed, cycle (recycle) gas, inert carrier gas (e.g., nitrogen, argon, or inert hydrocarbon such as ethane, propane, butane, isopentane, etc.) and, if desired, modifiers (e.g., hydrogen). Thus, during the course of a polymerization, the bed comprises formed polymer particles, growing polymer particles, catalyst particles, and optional flow aids fluidized by polymerizing and modifying gaseous components introduced at a flow rate or velocity sufficient to cause the particles to separate and act as a fluid. Any catalysts typically employed to produce the desired polymer can be employed. Such catalysts generally include transition metal catalysts (including metallocenes) and rare earth catalysts, as well as anionic initiators. These catalysts can be selected from the group consisting of titanium, vanadium, chromium, cobalt, nickel, zirconium, neodymium, and anionic initiators (e.g., butyl-lithium). They can be introduced in liquid or solid (supported or spray dried) form into the polymerization.

In general, the polymerization conditions in the gas phase reactor are such that the temperature can range from sub-atmospheric to super-atmospheric, but is typically from about 0 to 120° C., preferably about 10 to 100° C., and most preferably about 25 to 80° C. Partial pressure will vary depending upon the particular monomer or monomers employed and the temperature of the polymerization, and it can range from about 1 to 450 (6.89 to 3100 kiloPascals), preferably 1 to 300 psi (6.89 to 2067 kiloPascals). Condensation temperatures of the readily condensable monomers are well known. In general, it is preferred to operate at a partial pressure slightly above to slightly below (that is, for example, ±10° C. for low boiling monomers) the dew point of a readily condensable monomer (e.g. butadiene or isoprene).

Post-reactor Treatment and Polishing.

Upon leaving the gas phase polymerization reactor, the above-enumerated sticky elastomeric material, having been produced as non-sticky polymers using one or more inert particulate materials, are dusty and contain loosely attached fines (inert particulate material or inert particulate material mixed with a small amount of polymer) on their surface. The surfaces of the polymer particles are diffuse and have small carbon black attachments or inert particulate materials attachments, distributed evenly around the polymer particles. The amount of loose inert particulate material (e.g., carbon black) between polymer particles is a function of the overall inert particulate material level. Particles are generally spherical from the reactor and typically contain a small amount of 2 to 4 polymer particle agglomerates. The polymer particles using carbon black have a dull black matte finish. Shiny reflective spots were sometimes apparent under the carbon black covering. Carbon black or other inert particulate material are easily sloughed off as fines.

When these polymers having fines leave the reactor, they are subjected to downstream processing such as purging to remove unreacted diene, mixing with one or more a stabilizers, fluidizing, conveying, heating, and cooling, and packaging processes. If the fines are only loosely attached to the surfaces of these polymers during this post reactor handling, some of the fines will separate from the polymer and foul lines and equipment (plugging rotary feeders, transfer lines, product heater, purgers, coolers, and blend bins) causing continuous production to cease.

The present invention keeps the fines firmly attached or bound to the polymer to prevent particle attrition and maintain flowability during subsequent processing. That is, it results in a "robust" particle throughout the post-processing procedures. By "robustness" is meant the ability of the polymer particles to withstand subsequent processing without undergoing either substantial attrition of material from the polymer particles or damage to the particles. The post-reaction fluidized bed processing modifies the polymer particles and reduces the amount of material typically attrited during subsequent processing to a fraction of that which would be attrited without undergoing the fluidized bed processing.

Robustness can be measured in several ways. The methods used in the work cited herein include sonication and mechanical impact of EPR particles. Sonication involves subjecting an EPR containing solution with bursts of ultrasonic waves. Fines are measured before and after sonication. That is, robustness is a measure of the difference in the before and after fines levels. Mechanical impacting involves subjecting a 100 gram sample of EPR resin to the impacts of one hundred ½-inch diameter chrome-plated ball bearings during a Rotap process. The fines level on the EPR sample is first quantified using a standard Rotap sieve analysis. The sample is re-combined and added to a 120-mesh sieve along with the ball bearings. A 200-mesh sieve and pan are installed under the 120-mesh sieve as normal, and the entire assembly re-installed in the Rotap apparatus. The Rotap is started and run for times ranging from about 5 and 10 minutes. Fines levels are then quantified, and the increase in fines from the ball bearing attrition test calculated by subtracting the initial fines levels. This Rotap test procedure is the preferred method for determining fines level or fines attrition.

The amount of improvement in robustness depends upon residence time in the fluidized bed, carbon black level, superficial gas velocity, temperature of the bed, resin composition etc. However, in general, fluidized bed processing results in a level of fines attrition as measured by the ball bearing Rotap procedure that range from only 30% of the initial pre-fluidized bed attrition values, up to 95% of the initial values. Further improvements in the fluidized bed process may result in attrition of less than 10% of the initial values; in most work conducted to date, attrited fines are less than 50% of the initial pre-fluidized process values. That is, a particle of polymer has fines attached (loosely) to it. The attached fines are attrited during the Rotap procedure. The fewer the fines attached to the polymer particle the fewer the fines that will be removed during the procedure. The smaller the number of fines removed in the procedure after polishing the more robust the particle. Also the larger the number of fines removed in the Rotap procedure on a particle that has just left the reactor (no polishing), the less robust the particle before it is polished. Accordingly, acceptable particle attrition values are below 95%, preferably below 50%, and most preferably are below 20% after polishing.

In this invention, the gas phase produced polymer with loosely attached inert particulate material goes through a number of post reaction steps before packaging. These steps involve, or can include, for example: light monomer and co-monomer purging and recovery; screening of agglomerates; polishing; catalyst-co-catalyst by-product neutralization and/or stabilization; and diene purging and recovery. Of all post reactor steps, polishing, neutralization, diene purging, and stabilization steps are the most important. In a preferred embodiment, polishing, neutralization, diene purging, and stabilization take place in a single step, preferably in the fluidized bed polishing vessel. In general, the more extensive the post-reactor polishing, through mechanical mixing and/or fluidization, the more robust the polymer particles become.

Polishing occurs by gas fluidized mixing, optionally assisted by mechanical mixing, to provide a robust product having improved flowability and decreased levels of fines and attrition. Preferably polishing is accomplished by gas fluidization or a combination of gas fluidization and mechanical mixing rather than mechanical mixing alone. Preferably, polishing includes purging or removal of at least a portion of unreacted diene. It can also include stabilization of the product and residual catalyst by-product neutralization.

The following description of the post-reactor process of the invention is based on FIG. 1 for an EPR polymer (specifically an ethylene-propylene-ethylidene norbornene rubber) polymerized using carbon black as the inert particulate material. Optionally, polymer particles having fines (e.g., carbon black) associated with them are discharged from the gas phase fluidized polymerization reactor to one or more product holding or product receiving vessels. Preferably at least one such product receiving vessel is employed. Product from the reactor enters the product receiving vessel in a batchwise or continuous (including semi-continuous) manner, preferably it enters continuously.

Product receiving vessels are commercially available and can include, for example, Day® or Natta® mixers or a settled bed with bottom discharge. Such holding/receiving tanks can include stirring means such as paddles, revolving screw agitators, and/or blades though these are not required. In the product receiver, the EPDM is contacted with nitrogen or another inert gas (e.g., argon, carbon dioxide, a saturated $C_1$–$C_{12}$ hydrocarbon such as ethane, propane, butane, isopentane, etc.). Preferably, the nitrogen is heated to approximately 70° C., but can range from 55 to 120° C. Nitrogen and unreacted monomer(s) (e.g., propylene) exit from the top of the vessel. The unreacted monomer(s) can be, and is/are preferably, recycled to the reactor. Generally, the elastomer exits the product holding/receiving tank continuously (including semi-continuously) or batchwise, preferably continuously.

Upon exiting the product receiving vessel, the polymer product is optionally passed via gravity through a rotary valve (e.g., a Rader rotary feeder valve) to a particle screening device to remove larger agglomerates, if present. A screening device is preferred in the process of the invention. Preferably, the screening device is equipped with interchangeable screens which can remove particles as small as ¼-inch to 1-inch in diameter. Most preferably the screening device is designed to remove agglomerates larger than ½ inch (1.27 cm) to ¾-inch in diameter. The screening device can be a vibrating screen or sieve. Removal of such chunks/agglomerates when present eliminates the potential for them to compromise downstream operations.

Once the larger agglomerates are removed using the screening device, the product is passed via another rotary valve continuously to a fluidized bed polishing vessel. Preferably polymer containing inert particulate material enters at or near the top of the polishing vessel. When the polishing vessel has a dome-like or expanded section at its top, preferably a conduit or pipe is utilized to feed polymer-inert particulate material product through this section to the fluidizing section of the polishing vessel.

In the polishing vessel, product is subjected to continuous gas fluidization. The fluidizing gas utilized in the polishing vessel is an inert gas such as nitrogen or recycled gas (primarily inert gas) obtained from the diene vent recovery unit. Preferably the fluidizing gas is hot nitrogen (20 to 150 degrees C, e.g., 120 degrees C) The fluidizing gas enters the polisher from the bottom of the vessel and preferably flows through a distributor plate located at or near the bottom of the polishing vessel upward through the bed of polymer product. Preferably, the distributor plate is designed such that it is funnel-shaped and is at least 10 degrees from horizontal, most preferably, it has at least a 30 degree angle with the bottom of the polishing vessel. The product is discharged continuously or semi-continuously at a desired rate through a discharge line situated in the middle of the conical distributor plate. Unreacted diene diluted with the fluidizing gas exits from at or near the top of the polishing vessel and is sent to a diene vent recovery unit which strips the diene from the recycled gas and collects it as a liquid for re-use and/or other disposal. Typically, at least about 50% or more of the residual diene will be purged from the polymer and recovered.

The conditions inside the polishing vessel (approx. 74 feet in height) containing a fluidized bed area measuring about 32 to 37 feet in height and 11 feet in diameter are as follows. The temperature ranges from about 20° C. to 100° C., preferably 55° C. to 80° C., most preferably 60° C. to 75° C. Pressure can range from sub-atmospheric (−2 psi) to 50 psi, preferably 0 to 5 psi, most preferably 1 to 3 psi. The average residence time for the polymer particles in the polishing vessel ranges from about 1 to 8 hours, preferably about 2 to 6 hours, and, most preferably, is about 2 to 4 hours. The superficial gas velocity (SGV) inside the polishing vessel; ranges from about 0.6 to 3 ft/sec, preferably 0.8 to 3 ft/sec, and most preferably 1 to 1.6 ft/sec.

While the elastomeric material is in the polishing vessel, it is preferably contacted with one or more catalyst/co-catalyst deactivators/stabilizers to inhibit crosslinking, one or more gel inhibitors to prevent/minimize gel formation; and/or odor control agents (e.g, soybean oil, zinc oxide). Gel formation can be due to the existence of residual diene, chloride by-products of the co-catalyst and promoter. Gel inhibitors can include a $C_1$–$C_{20}$ alcohol, preferably methanol, ethanol, isopropanol). Gel formation is treated by injecting a gel inhibitor proportional to the amount of alkyl (i.e., for example, the aluminum alkyl co-catalyst) used in the polymerization reaction. The molar ratio of alcohol-to-alkyl is about 0.5:1 to 6:1.

Stabilizers are added to protect the polymer from free-radical-initiated degradation, transition-metal-catalyzed degradation, and/or acid-catalyzed degradation. Stabilizers can include, for example, antioxidants and/or antiozonants, e.g, vitamin E, calcium carbonate, calcium sulfate, thioesters, mineral oil, etc. Stabilizer is combined with polymer in an amount ranging from about one to five parts stabilizer or stabilizer package per 100 parts polymer. These additives are generally in the form of liquids (or less preferred solids) and can be injected together, but preferably are injected separately into the fluidized bed section of the polisher using conventional nozzles at one or more locations. Preferably, the stabilization package can be injected into the fluidized bed polisher by utilizing multiple nozzles insert extending from 1 to 3 feet inside the polisher and at different levels extending from 1-foot above the polisher gas distributor plate to the top of the polymer bed. The stabilization package can be mixed in an oil carrier to improve the dispersion of the stabilizer. Alternatively, the stabilization package can be injected into the conveying line between the polisher and purger.

The polishing vessel is further preferably equipped with one or more internal bag filters to prevent fines from entering the diene vent stream to the vent recovery unit. Alternatively, one or more bag filters may be mounted external to the polisher in the vent recovery line. The fines collected in external bag filters can be routed to the bottom of the polishing vessel and introduced there to achieve more effective mixing of fines.

After polishing and treatment in the fluidized bed polisher, the polymer particles are more elastic and contained little or no loosely attached fines on their surfaces. That is, after polishing the fines are more firmly incorporated into the final polymer. There is a large change in polymer product. The polymer particles remained essentially spherical but had virtually no free carbon black. Additionally, the polymer particle surfaces can be and were smooth and highly polished. That is in addition to robustness, the particles can have reflective surfaces and appeared glossy or shiny.

Polymer is discharged from the polishing vessel more or less continuously through at least two rotary valves. The two rotary valves are used to provide an airlock and prevent conveying air from entering the polishing vessel. From there it is conveyed via air to one of at least two fluidized bed purgers, preferably three fluidized purgers. The purgers can be operated in parallel or in series. They can operate in a continuous or batch mode. In a preferred embodiment two or three fluidizing purgers are operated in parallel batchwise. When three purgers are employed, one should be filling with polymer material, while a second is heating/cooling product, and the third is emptying polymer. The air conveyer system utilizes at least one blower to transport product to each of the two or three purgers. Typically the conveyed product will be at a temperature ranging from about 60 to 110 degrees C, e.g., 70 degrees C, or other temperature at which it flows easily for filling the purgers.

The purgers (approx. 59 feet in height) are preferably virtually identical, having a fluidized bed area measuring about 14.5 ft in diameter by 21 ft in height. They are designed to operate batch-wise and in parallel. Preferably each of the purgers contain internally mounted bag filters to prevent fines from exiting. The purgers employ air as the purging medium because of its low cost and its ability to purge diene (e.g., ENB) to low levels in the solid polymer. Hot moist air provided by air compressors/heaters/aftercooler enters each purger through a distributor plate located at the base of the purger. The fluidizing gas (e.g. moist air) enters each purger from the bottom of the vessel and preferably flows through a distributor plate located at or near the bottom of the purging vessel upward through the bed of polymer product. Preferably, the distributor plate is designed such that it is conical or funnel-shaped and is at least 10 degrees from horizontal; most preferably, it has at least a 30 degree angle with the bottom of the purging vessel. The fluidizing gas flows countercurrently through the bed of polymer particles, and exits at or near the top of the purger. Exiting moist air and/or other gases containing low levels of hydrocarbons are sent to a catalytic oxidizer. The filling/heating procedure lasts for about 4 to 5 hours. During each batch cycle, a purger is filled with product, and the product is heated to 90 to 100 degrees C using heated moist fluidizing air (at about 125 degrees C). After a purger is filled and heated using hot air, the temperature in the purger will be maintained or increase to about 90 to 100 degrees for 15 minutes to 3 hours, typically 30 minutes to 2 hours. Steam injection is used to maintain a constant, known level of humidity in the purgers and for the destruction of alkoxides and/or removal of odor causing agents and odor prevention. The purger superfical gas velocity ranges from about 0.9 to 3 fps, preferably 1 to 1.6 fps (feet per second). Preferably the each of the purgers have one or more internal bag filters.

After heating in the purger is completed and while still maintaining the product in the fluidized state, product is cooled to as low as 35 degrees C initially, preferably about 40 to 45 degrees C by means of an air chiller utilizing propylene glycol/water brine. When the product in the purger has been cooled to the desired temperature it is discharged through a discharge line in the conical distributor plate from the bottom of each of the purgers through a rotary feeder and conveyed to hopper cars, bagging lines, or blending bins.

Additional Product Improvement.

Another way to improve the final product relates to the amount of inert particulate material employed during polymerization in the gas phase reactor. That is, it has been discovered that the lower the inert particulate material level employed during polymerization, the more robust the polymer particles become. Also, when low-level inert particulate material polymerization is employed in conjunction with the above-described polishing procedure, less time is generally required in polishing. Decreased inert particulate material (e.g., carbon black) levels during polymerization have a positive effect on reactor product and final product, resulting in lower fines and attrition levels and more elastic particles. And, under most conditions, flowability improved at lower inert particulate material levels.

During polymerization, inert particulate material levels should be maintained between the reactor critical inert particulate material level (minimum) and the post-reaction critical inert particulate material level (maximum). The reactor critical inert particulate material level is the amount of inert particulate material required to render the polymer non-sticky and fluidized, or fluidizable, during polymerization. Conducting a polymerization in the gas phase below the reactor critical inert particulate material level can result in the polymer being produced agglomerating in the reactor.

The post-reaction critical inert particulate material level is the amount of inert particulate material that can be firmly incorporated into the polymer during polishing. It is the minimum reactor critical inert particulate material level and (or plus) that excess which can be incorporated into the polymer during polishing. If the polymer exiting the reactor contains more than the post-reaction critical inert particulate material level of inert particulate material, the inert particulate material is not sufficiently incorporated in the polishing step and the product loses some of its robustness.

The range of the amount of inert particulate material defined by the minimum reactor critical inert particulate material level and the post-reaction inert particulate material critical level will vary depending on the stickiness of the polymer being produced. In general, stickiness of a polymer is determined by the amount of the monomer itself (e.g., butadiene) when a single monomer, especially a readily condensable monomer is polymerized or the amount of diene and comonomer (e.g., ENB and propylene) as in the case of an EPR polymer.

In the present invention the following mathematical relationship can serve as a guide for pre-determining these amounts of inert particulate material (e.g., carbon black) for a given polymer such as an EPR product with an ethylene content, for example, in the range of 50 to 80 wt %:

Carbon Black Level (phr)=78–0.9* Ethylene Content, where phr is defined as parts of carbon black per 100 parts rubber.

For example, in the present invention, for polymers containing inert particulate materials, especially for making ethylene-alpha olefin rubbers and ethylene-alpha olefin diene rubbers, it is preferred to use inert particulate material in the reactor polymerization in an amount ranging from about 6 to 40 phr (per hundred rubber) to increase the robustness of the elastomer particle and reduce the level of fines attached to the polymer as it enters a polishing vessel. In general, the amount of co-monomer (e.g., propylene) and diene in an EPR rubber is determined based on its eventual end-use application. For example, for a typical ethylene-alpha olefin-diene elastomer for a roofing product having a Mooney ranging from 60–70, an alpha olefin (e.g., $C_3$) content of 32–40%, and a diene content (e.g., ENB) of 2–3%, the amount of inert particulate material (e.g., carbon black) employed during the gas phase polymerization ranges from about 15 to 25 phr. For a typical ethylene-alpha olefin-diene elastomer for a hose product having a Mooney ranging from 60–70, an alpha olefin (e.g., $C_3$) content of 28–32%, and a diene content (e.g., ENB) of 3–5%, the amount of inert particulate material (e.g., carbon black) employed during the gas phase polymerization ranges from about 10 to 20 phr. For a typical ethylene-alpha olefin-diene elastomer for a start-up product having a Mooney ranging from 60–80, an alpha olefin (e.g., $C_3$) content of 20–22%, and a diene content (e.g., ENB) of 1–2%, the amount of inert particulate material (e.g., carbon black) employed during the gas phase polymerization ranges from about 6 to 10 phr. For a single monomer polymerization employing a readily condensable monomer (e.g., using butadiene) the amounts are may be somewhat higher.

Reactor operations utilizing these lower inert particulate material levels, result in a reduced level of fines initially as the elastomer exits the gas phase reactor as determined by Laser Diffraction Testing, improved flowability as measured using a Peschl® Shear Tester; and lower polymer/elastomer particle attrition in downstream processing as indicated by particle size distribution before and after sonication evaluations or a Rotap procedure. A polymer polymerized with reduced inert particulate material levels is further improved by subjecting it to post-treatment polishing as described above.

All references cited herein are incorporated by reference

Whereas the scope of the invention is set forth in the appended claims, the following specific examples illustrate certain aspects of the present invention. The examples are set forth for illustration only and are not to be construed as limitations on the invention, except as set forth in the claims. All parts and percentages are by weight unless otherwise specified.

EXAMPLES

Product Flowability.

Flowability of the EPR products was measured using a Peschl® shear tester. The results were reported as a flow factor (FF), which is a non-dimensional unit directly proportional to flowability. Also reported was the required bin opening for flowability (Bc) in units of feet, which parameter is inversely proportional to the flow factor. For each sample, three test measurements were conducted at ambient temperature and at 65° C., for a total of six tests. They were as follows: (1) IYL, instantaneous yield locus—fill sample cell, run test immediately; (2) 30 minutes/0 psi compaction—fill sample cell, wait 30 minutes before testing; and (3) 30 minutes/5 psi compaction—fill sample cell, apply 5 psi compaction for 30 minutes before testing.

Particle Size Distribution and Fines Level.

Particle size distribution and fines level were determined using ROTAP® and Laser Diffraction measurements. ROTAP® employs standard sieve analysis to determine the particle size distribution including fines level. Fines level was defined as the weight percent of particles small enough to fit through a 120 mesh sieve, which is commonly referred to as "<120 Mesh". Laser Diffraction was the method employed on granular samples (e.g., EPDM) to determine particle distribution including fines level using a Horiba® LA-910 instrument. The fines level was defined as the volume percent of particles smaller than 100 microns in diameter. This test procedure was generally more sensitive to changes in fines levels than the ROTAP® procedure.

Particle Attrition.

The tendency of a sample to generate fines during handling was predicted by using the laser diffraction method on a sample both before and after sonication (subjecting a sample to sound waves for a given period of time). The change in fines level correlates with sample attrition.

Morphological Characterization.

Morphological studies were conducted using optical microscopy (OM) and field emission scanning electron microscopy (FE-SEM). OM studies were conducted using a Nikon® SMZ-10 stereo-zoom optical microscope with a magnification range of 8×–48×. Samples were prepared for observation by placing a ⅜-inch (approx.) layer of sample in a 3-inch petri dish, adjusting incident light and magnification, and recording the image of a selected area using an attached Polaroid® camera. FE-SEM observations were made using a JEOL® JSM-6300F field emission scanning electron microscope. Specimens were prepared by placing a representative sample of material on an SEM sample mount covered with double-sided adhesive tape. The mounted sample was inserted in the microscope and observed at an accelerating voltage of 2 kV. Observations were made at 10× magnification to show the general shape and size of the particles, then at higher magnifications (e.g., 50×~20,000×) to show macro- and micro-morhphology.

Carbon Black Level in Fines. The carbon black level in product fines (<120 Mesh portion of ROTAP® analysis) was measured by thermogravimetric analysis for determination of carbon and residue ash.

Example 1 (Comparative)

This example demonstrates the lack of robustness, particle attrition, and/or poor flowability in the absence of a polishing step.

Ethylene-propylene product with 0.1 to 0.2 wt % ethylidene norbornene polymer was prepared in a gas phase process as disclosed in U.S. Pat. No. 4,994,534 at a rate of 14,000 pounds per hour. Carbon black was fed as a fluidization aid to the reactor at a level and rate so that the polymer produced had about 16 phr carbon black on the polymer produced. The reactor was operated at 40 degrees C reaction temperature using a vanadium tris acetylacetonate (V(AcAc)3) catalyst supported on silica. The co-catalyst was a mixture of two aluminum alkyls: diethyl aluminum chloride and triethyl aluminum DEAC-TEAL) in a 5:1 molar ratio. The promoter was ethyl trichloroacetate (ETCA). The gas composition in the reactor was as follows: propylene-to-ethylene molar ratio of 1.88; hydrogen-to-ethylene molar ratio of 0.022; and ethylene partial pressure of 81 psi.

After leaving the gas phase polymerization reactor, the polymer particles were discharged to a receiving vessel using a conveying gas ($N_2$) taking care to prevent the polymer particles from coming into contact with air, oxygen, or other product degrading gases. In the product receiving vessel (or holding tank) unreacted monomer (especially alpha olefin monomer such a propylene) was removed for purification and/or recycling to the polymerization reactor.

The polymer particles with carbon black were continuously discharged from the product receiver through a rotary feeder to a product heater where the product was heated to 55 to 75 degrees C and the residual catalyst and co-catalyst was neutralized using an alcohol (e.g. methanol). The product was discharged into a rotating blender where a liquid stabilizer was added. The product with a stabilizer was then dicharged to a surge hopper-rotary feeder arrangement to control feed rate to purgers (nitrogen) where unreacted residual ENB was removed prior to packaging.

Following the removal of residual ENB in the purgers, the polymer particles were cooled to 35 to 40 degrees C and evaluated for robustness (i.e., particle attrition and/or flowability). The particles were found to be dusty with either loose carbon black or poorly unadhered carbon black that flaked off the particles. This loosely adhered carbon black and dustiness caused severe handling problems downstream of the product receiver. Accumulation of fines of mainly compacted carbon black in the lines leading to the product heater and on the surge hopper walls and rotary feeders led to restriction of product flow to the purgers. Also, the compacted carbon black build-up (i.e. crust) was observed to peel off, plugging rotary feeders and causing unit shutdown. Post-mortem examination revealed severe carbon caking on the inlet piping to the product heater. The surge hopper rotary feeder had a carbon bridge at the bottom just above the rotary feeder. The stabilization additive blender was also observed to vibrate badly during operation at the above conditions. Buildup of hard-caked carbon in the blender was found to be the cause of the vibration problems. The dust and free carbon black severely affected the sealing, handling, and storage of bags of product and interfered with bulk handling into hopper cars.

The polymer particles had an average particle size of about 0.044 inches with about 0.9 wt % fines (that pass through 120 mesh screen). Using a ball bearing test to assess the level of attrited carbon black/fines on the polymer particles resulted in a an attrited fines level of about 3.7 wt %. Product particles morphology analysis showed the particles to have poor morphology as indicated by the presence of very fine aggregates (i.e., "fuzzies") on the surface of the particle (using optical microscope). Examination of the particles showed them to have brittle coating/layer of carbon black that flaked off easily when rubbed.

Example 2

This example demonstrates that post-reactor processing using a polisher and air purgers results in robust, fine-free, granular polymer particles.

EPDM product is produced as in Example 1, except that the product is discharged from the product receiver to a particle screener where agglomerates larger than ½-inch (1.27 cm) are removed before the product is discharged to a fluidized bed polishing vessel. In this vessel, the product is heated to about 60 to 75° C. for about 4 hours at 1 to 3 psi. Approximately 50 to 70 wt % of residual unreacted ENB is removed by condensing it out of the fluidizing gas (i.e., nitrogen) by refrigeration. Also, the polymer particles with loose carbon black are subjected to residual catalyst/cocatalyst neutralization by the addition of isopropanol which is fed at a rate based on the amount of alkyl fed to the reactor in the range of isopropanol-to-alkyl molar ratio of 1.5. The product in the fluidized bed polisher is also treated with 4 phr of a liquid stabilizer before discharge to a moist air fluidized bed purger. The stabilizer contains 0.63 wt % Vitamin E; 5 wt % ditridecyl thiodipropionate; 30 wt % HyBase® C-400 (a calcium additive); and 0.13 wt % Plastistab® 2116 (a barium tracer), in a mixture of mineral oil and soybean oil. About 50 to 70 wt % of residual ENB is removed by condensing it out of the purge gas by refrigeration.

The polymer particles after polishing and treatment in the fluidized bed polisher have smooth, and highly polished (or shiny) surfaces and contain little or no loosely attached fines on their surfaces. That is, the fines and carbon black are more firmly incorporated into the final polymer.

The product is discharged continuously from the fluidized bed polisher to one of two fluidized bed purging vessels operated in parallel batchwise. During each batch cycle, a purger is filled with product, and the product is heated to 90 to 100 degrees C using heated moist fluidizing air (at about 125 degrees C). The temperature in the purger is maintained at about 90 to 100 degrees for about 2.25 hrs.

After heating in the purger is completed, and while still maintaining the product in the fluidized state, the product is cooled to about 40 degrees C by chilling the fluidizing air to about 5 degrees C before discharging to a blending bin. The polymer particles are then evaluated for robustness. The product particles have a spherical shape with robust shiny carbon black coating. Carbon black dustiness and fines levels are markedly decreased, and build-up on lines in postreactor equipment and lines are substantially reduced.

Example 3

This example demonstrates the added beneficial effect of fluidized bed polishing provided by reactor operation at low carbon black levels.

A reactor was operated at 40° C. to produce EPDM product using V(AcAc)3 catalyst with DEAC-TEAL (5:1 mole ratio) as cocatalyst and ETCA as promoter at an average production rate of about 80 pounds per hour. Carbon black was fed continuously to the reactor to have about 19 to 26 phr in the polymer. The product discharged from the reactor had an average particle size of 0.024 to 0.033 inches with 0.3 to 1.4 wt % fines (through a No. 120 screen), measured by Rotap for 5 minutes. The EPDM product had a propylene content of 36.6 to 37.9 wt %; ENB content of 2.2 to 2.4 wt %; and a 61 to 65 Mooney viscosity. The product was discharged from the reactor to a stirred hold vessel where it was collected for 3 to 6 hours. Methanol was fed to the hold vessel to neutralize catalyst/cocatalyst based on the amount of alkyl fed to the reactor in the range of methanol-to-alkyl molar ratio of 1.4. The product in the hold vessel was also treated with 4 phr of a liquid stabilizer before discharging to a fluidized bed purger. The stabilizer contained 0.63 wt % Vitamin E; 5 wt % ditridecyl thiodipropionate; 30 wt % HyBase® C-400 (a calcium additive); and 0.13 wt % Plastistab® 2116 (a barium tracer), in a mixture of mineral oil and soybean oil. The product was dropped through a ¼-inch screen and was fluidized at 0.8–1.2 ft/s in a fluidized-bed purger at temperatures ranging from 50 to 90° C. The fluidizing gas was nitrogen. In this vessel, the product was batch fluidized for 3 to 6 hours. The residual ENB was removed by condensing it out of the purge gas by refrigeration. The nitrogen was reheated and recycled to the purger.

It was found that the particles of elastomer product that were fluidized and purged from 2 to 6 hours were nearly or completely free of dust. Observation during gentle handling indicated that loose carbon dust was virtually absent. Further, measurement by Laser Diffraction showed no particles smaller than 100 microns in nearly all samples.

The particles also had increased resistance to attrition. Laser diffraction measurements of particles that had been sonicated in isopropanol showed a concentration of particles smaller than 100 microns that decreased with purging time. The volume-average concentration decreased, on average, from 5% before purging to 3% after 2 hours of purging. After 6 hours of purging, the concentration decreased to nearly 1%. A similar improvement in attrition resistance was observed in the purged particles when they were screened in the presence of ball bearings. The amount of fine particles that fell through a No. 200 screen following screening with ball bearings for 5 minutes decreased from 0.95 wt % before purging to 0.65 wt % after 2 hours of purging. The amount of these fines fell further, to 0.40 wt % after 6 hours of purging.

Finally, the particles became polished during the time spent in the fluidized-bed purger. Photomicrographs of product collected from the reactor indicated that the surface of the particles was diffuse and porous. The particles were typically covered with small carbon black attachments and had a dull black matte finish. Detached dust particles were mixed in with the larger product particles. Following purging, the surfaces of the particles were smooth and polished. The surfaces were reflective and glossy. Loose dust particles were absent.

Example 4 (Comparative)

This example demonstrates the adverse effect that polymerizing in the reactor with high carbon black levels have, even when polishing is carried out post-reactor.

An EPDM product was continuously produced in a reactor at a production rate of about 80 lb/h as in Example 3. The composition of the polymer was similar to that in Example 3. In case 4a, the amount of carbon black fed to the reactor resulted in a loading of about 29 phr. In case 4b, the carbon black loading was reduced to 19–24 phr. In both cases, the product was transferred to an unstirred hold vessel with minimal residence time, about 10 minutes. Isopropanol was fed to the hold vessel to neutralize catalyst/cocatalyst based on the amount of alkyl fed to the reactor in the range of isopropanol-to-alkyl molar ratio of 1.4. Then the product was passed through a ¼-inch screen to the fluidized-bed purger.

By means of adding product to the purger and removing portions of product through the bottom, the level of product in the purger was maintained at a constant level while it operated in a continuous mode. The mean residence time in the purger was 2.1 hours in case 4a and 2.9 hours in case 4b. The superficial gas velocity of the fluidizing gas (nitrogen) was 1.25 ft/s and the temperature of the product was maintained at 65° C. for each. The residual ENB was removed by condensing it out of the purge gas by refrigeration. The nitrogen was reheated and recycled to the purger.

In case 4a, where the carbon black loading was about 29 phr, the level of fines smaller than No. 120 screen, measured by Rotap® for 10 minutes, was as high as 20 wt %. The volume-average amount of fines smaller than 100 microns measured by Laser Diffraction in unsonicated samples ranged from 20 to 36%. The average volume increase in these fines after sonication was 6%. When purged samples were screened in the presence of ball bearings for 5 minutes, the amount of fines that fell through a No. 200 screen ranged from 1.0 to 1.9 wt %. This elevated level indicates that the particles were still highly attritable. The purged product appeared polished in photomicrographs, but numerous small particles of dust were present on and around the product particles.

In case 4b, the carbon black loading was lower, ranging from 19 to 24 phr. The level of fines smaller than No. 120 screen, measured by Rotap® for 10 minutes, ranged from 1 to 3.5 wt %. The volume-average amount of fines smaller than 100 microns measured by Laser Diffraction in unsonicated samples was generally less than 1 %. The volume increase in these fines after sonication was 3%. Attrition testing of purged samples using screening with ball bearings showed a more robust particle. The amount of fines that fell through a No. 200 screen in 5 minutes ranged from 0.1 to 0.35 wt %. This value was slightly lower than that found in Example 3, and much lower than found in particles made with high levels of carbon black in case 4a. The particles were polished and dust particles were not seen.

Therefore, it is seen that while treatment of these black EPDM particles in a fluidized bed imparts polishing and improved attrition resistance, particles polymerized with an excess of carbon black continue to have some dustiness and a tendency to attrit.

Example 5

This example demonstrates the benefits of polymerizing and post-treating with minimal carbon black levels in the gas-phase fluidized-bed polymerization reactor.

A reactor was operated at 40° C. to produce EPM product using V(AcAc)3 catalyst with DEAC-TEAL (5:1 mole ratio) as cocatalyst and ETCA as promoter at an average production rate of about 80 pounds per hour. The EPM product had a propylene content of 34.9 to 38.7 wt %; trace ENB content of about 0.3 wt %; and a 54.5 to 75.9 Mooney viscosity. Carbon black was fed continuously to the reactor resulting in a carbon level of 29.4 phr (parts per hundred parts rubber) for case 5a and 14.3 phr for case 5b. The product samples were quenched in a sample pot with excess methanol for cocatalyst deactivation and given a small nitrogen purge at 40° C. to remove gross amounts of the light hydrocarbons.

In case 5a, at 29.4 phr carbon black, FE-SEM photographs (see Photograph 1) showed that the product particles were coated with loosely attached fine particles. These fine particles were easily removed with a pair of tweezers and no polished surfaces existed under the loose carbon black layer. The volume-average amount of fines smaller than 100 microns measured by Laser Diffraction in unsonicated samples was 17%. The volume increase in these fines after sonication was 17.3%. High initial fines levels as well as the high attrition levels indicate the lack of robustness of these particles. Flowability measurements with the Peschl shear tester verified this lack of robustness in that the flow properties were poor.

In case 5b, at 14.3 phr carbon black, FE-SEM photographs (see Photograph 2) showed that the amount of loosely attached fines were much lower than for case 6a and that reflective (or shiny) areas existed on the surface of the particles. The volume-average amount of fines smaller than 100 microns measured by Laser Diffraction in unsonicated samples was 4.1%. The volume increase in these fines after sonication was 10.8%. These fines levels indicate improved particle robustness as compared to case 5a. Flowability measurements with the Peschl shear tester indicated improved flow properties as compared to case 5a for instantaneous and 30 minute storage tests at both ambient temperature and 65° C.

Therefore, it is shown that black EPM may be produced in the gas-phase fluidized-bed reactor with improved robustness at lower carbon black levels.

Example 6

This example demonstrates further benefits of operating with minimal carbon black levels in the gas-phase fluidized-bed polymerization reactor, particularly, for post-polishing.

A reactor was operated at 40° C. to produce EPM product using V(AcAc)3 catalyst with DEAC-TEAL (5:1 mole ratio) as cocatalyst and ETCA as promoter at an average production rate of about 80 pounds per hour. The EPM product had a propylene content of 34.9 to 38.7 wt %; trace ENB content of about 0.3 wt %; and a 54.5 to 75.9 Mooney viscosity. Carbon black was fed continuously to the reactor resulting in a carbon level of 33.4 phr for case 6a and 17.3 phr for case 6b. The product was discharged from the reactor to a stirred hold vessel where it was collected for 3 hours. Methanol was fed to the hold vessel to neutralize catalyst/cocatalyst based on the amount of alkyl fed to the reactor in the range of methanol-to-alkyl molar ratio of 1.4–1.5. The product in the hold vessel was also treated with 4 phr of a liquid stabilizer before discharge to a fluidized bed purger. The stabilizer contained 0.63 wt % Vitamin E; 5 wt % di-tridecyl thiodipropionate; 30 wt % HyBase® C-400 (a calcium additive); and 0.13 wt % Plastistab® 2116 (a barium tracer), in a mixture of mineral oil and soybean oil. The product was dropped through a ¼-inch screen and was fluidized at 1.3–1.5 ft/s in a fluidized-bed purger at a temperature of 70° C. The fluidizing gas was nitrogen. In this vessel, the product is batch fluidized for 3 hours. The residual ENB was removed by condensing it out of the purge gas by refrigeration. The nitrogen was reheated and recycled to the purger.

For case 6a, at 33.4 phr, the particles were highly polished with non-elastic deformation (see Photograph 3). That is, if a particle was squeezed with tweezers, it tended to stay in the shape to which it was deformed. The carbon coating was tightly held and upon squeezing with tweezers, fractured and fell off in pieces. The volume-average amount of fines smaller than 100 microns measured by Laser Diffraction in unsonicated samples was 0%. The volume increase in these fines after sonication was 12.7%. Therefore, the initial fines level is low, but the resistance to attrition is not. Flow properties, as measured with the Peschl shear tester were good.

For case 6b, at 17.3 phr, the particles were highly polished with elastic deformation (see Photograph 4). That is, if a particle was squeezed with tweezers, it tended to return to its original shape. The carbon coating was so tightly held that it did not even come off after being squeezed several times with tweezers. The volume-average amount of fines smaller than 100 microns measured by Laser Diffraction in unsonicated samples was 0%. The volume increase in these fines after sonication was 0.1%. This is an indication of excellent resistance to attrition. As with the 6a sample, flow properties, as measured with the Peschl shear tester were good.

Therefore, it is shown that while polishing provides EPM particles with improved robustness, particles with excess carbon black levels still tend to attrit and exhibit non-elastic deformation.

What is claimed is:

1. A post-reactor process for improving the robustness of a polymer particle containing at least 0.3 wt % of an inert particulate material and having mixed therewith unreacted monomer, comprising: introducing the polymer containing at least 0.3 wt % of the inert particulate material and unreacted monomer into a polishing vessel wherein the polymer is fluidized using an inert gas; the temperature of the polymer ranges from about 20 to 100 degrees C; the temperature of a fluidizing gas ranges from about 20 to 150 degrees C; the temperature of the polishing vessel ranges from about 50 to 100 degrees C; the pressure in the polishing vessel ranges from −2 psi to 50 psi; the superficial gas velocity ranges from about 0.6 to 3 ft/sec; and the residence time for the polymer ranges from about 15 minutes to 8 hours.

2. The process of claim 1 wherein the polymer particles are contacted with at least one agent selected from the group consisting of a gel inhibitor, a catalyst inactivator, a stabilizer.

3. The process of claim 1 wherein at least a portion of unreacted monomer is removed.

4. The process of claim 1 wherein the polymer particles are subsequently purged.

5. The process of claim 1 wherein the product in the fluidized bed polisher is fluidized at a temperature ranging from about 50 to 80 C for about 1 to 5 hours.

6. The process of claim 1 wherein the polymer particles are produced in a gas phase fluidized bed polymerization reactor and contain 6 to 40 phr carbon black.

7. The process of claim 1 wherein agglomerates are removed before the polymer particles containing inert particulate material enter the polishing vessel.

8. The process of claim 4 wherein, upon leaving the polishing vessel, the polymer particles are contacted with moist air in one or more fluidized purgers.

9. The process of claim 1 wherein the inert particulate material is selected from the group consisting of carbon black, silica, clay, talc, and mixtures thereof.

10. The process of claim 1 wherein the polymer particles containing at least 0.3 wt % of an inert particulate material are produced by a gas phase polymerization process.

11. The process of claim 10 wherein said polymer is:
    a) a polyisoprene
    b) a polybutadiene
    c) a copolymer of butadiene and styrene
    d) a copolymer of butadiene and acrylonitrile
    e) a copolymer of isobutylene and isoprene
    f) a copolymer of ethylene and an alpha olefin having from 3 to 12 carbon atoms
    g) a terpolymer of ethylene, an alpha-olefin having 3 to 12 carbon atoms and a diene
    h) a homopolymer of an alpha-olefin having 2 to 18 carbon atoms
    i) a polychloroprene
    j) a polydimethylsiloxane
    k) a copolymer of ethylene and vinyltrimethoxy silane
    l) a copolymer of ethylene and one or more acrylonitrile, maleic acid ester, vinyl acetate, acrylic acid ester of methacrylic acid ester monomers
    m) a copolymer of butadiene and isoprene
    n) a polystyrene
    o) a terpolymer of styrene, butadiene and isoprene
    p) a brominated copolymers of isobutylene and isoprene
    q) a brominated copolymers of isobutylene and paramethylstyrene or
    r) chlorinated or chlorosulfonated polyethylene.

12. A process for substantially eliminating fines from ethylene-alpha olefin polymer particles produced in a gas phase fluidized bed reactor in the presence of inert particulate material, and optionally containing a diene, comprising
    (1) directing the polymer particles containing inert particulate material from the gas phase fluidized reactor and optionally containing one or more unreacted monomers into a product holding tank and contacting the polymer particles with an inert gas at a velocity and temperature sufficient to remove unreacted alpha olefin monomer;
    (2) passing said polymer particles containing inert particulate material having removed unreacted alpha olefin monomer to a screening device and removing agglomerates greater than ½ inch in diameter;
    (3) introducing said polymer particles having removed agglomerates into a polishing zone wherein the polymer particles are heated to 20 to 100° C.; unreacted diene monomer when present is partially removed; wherein the polymer particles are fluidized using an inert gas heated to a temperature ranging from about 20 to 150 degrees C; the pressure in the polishing vessel ranges from −2 psi to 50 psi; the superficial gas velocity ranges from about 0.6 to 3 ft/sec; and the average residence time for the polymer particles ranges from about 15 minutes to 8 hours;

(4) directing the polymer particles from said polishing vessel to at least one fluidized purging vessel in which said polymer particles are contacted with moist air heated to 60 to 150 degrees C for about 0.25 to 3 hours followed by cooling said polymer particles to 35 to 45 degrees C;

(5) discharging said polymer particles from said purging vessel.

13. A post-reactor process for removing monomer and improving the robustness of polymer particles which are comprised of:

polymer;

at least 0.3 wt % of an inert particulate material; and unreacted monomer, which comprises, fluidizing said polymer by the upward passage of an inert gas, to form a fully expanded unconstrained fluidized bed of said polymer in a generally cylindrical vessel, under the following conditions:

a) the temperature of said polymer when introduced into said vessel is from about 20 to 100 degrees C;

b) the temperature of said inert gas is from about 20 to 150 degrees C;

c) the temperature of said vessel is from about 50 to 100 degrees C;

d) the pressure within said vessel is from −2 psi to 50 psi;

e) the superficial gas velocity of said inert gas passing through said vessel is from about 0.6 to 3 ft/sec; and f) the residence time for said polymer within said vessel is from about 15 minutes to 8 hours.

\* \* \* \* \*